United States Patent [19]

Swan

[11] Patent Number: 5,631,771

[45] Date of Patent: May 20, 1997

[54] OPTICAL ISOLATOR WITH POLARIZATION DISPERSION AND DIFFERENTIAL TRANSVERSE DEFLECTION CORRECTION

[75] Inventor: Clarence B. Swan, Lower Macungie Township, Lehigh County, Pa.

[73] Assignee: Lucent Technologies Inc., Murray Hill, N.J.

[21] Appl. No.: 176,359

[22] Filed: Dec. 29, 1993

Related U.S. Application Data

[63] Continuation-in-part of Ser. No. 762,665, Sep. 19, 1991, abandoned.

[51] Int. Cl.$^6$ .............................. G02B 5/30; G02B 27/28; G02F 1/09
[52] U.S. Cl. .............. 359/484; 359/495; 359/496; 359/497; 359/281; 372/703; 385/11; 385/36
[58] Field of Search .................................. 359/281, 282, 359/283, 484, 495, 496, 497; 372/703; 385/11, 36

[56] References Cited

U.S. PATENT DOCUMENTS

| | | | |
|---|---|---|---|
| 4,178,073 | 12/1979 | Uchida et al. | 359/484 |
| 4,239,329 | 12/1980 | Matsumoto | 385/33 |
| 4,548,478 | 10/1985 | Shirasaki | 359/484 |
| 4,712,880 | 12/1987 | Shirasaki | 359/484 |
| 5,052,786 | 10/1991 | Schulz | 359/484 |
| 5,151,955 | 9/1992 | Ohta et al. | 359/281 |
| 5,237,445 | 8/1993 | Kuzuta | 359/484 |
| 5,251,058 | 10/1993 | MacArthur | 359/276 |
| 5,278,853 | 1/1994 | Shirai et al. | 372/703 |
| 5,315,431 | 5/1994 | Masuda et al. | 372/703 |
| 5,446,578 | 8/1995 | Chang et al. | 359/484 |

FOREIGN PATENT DOCUMENTS

| | | | |
|---|---|---|---|
| 0159245 | 12/1979 | Japan | 359/484 |
| 0016515 | 7/1983 | Japan | 359/484 |
| 0045219 | 3/1986 | Japan | 359/484 |
| 0139318 | 6/1988 | Japan | 359/484 |
| 0244015 | 11/1988 | Japan | 359/484 |
| 0276020 | 11/1988 | Japan | 372/703 |
| 0083523 | 3/1990 | Japan | 359/484 |
| 0188715 | 7/1990 | Japan | 359/484 |
| 9114193 | 9/1991 | WIPO | 359/484 |

*Primary Examiner*—Ricky D. Shafer

[57] ABSTRACT

An optical isolator includes an optical isolator unit including a main polarization discriminator in concatenation with a Faraday rotator, and an auxiliary polarization discriminator disposed in series with the optical isolator unit. One of the polarization discriminators initially divides an applied optical signal propagating in a forward direction along a reference axis into two polarized signals subsequently experiencing polarization dispersion and differential transverse deflection, while the other polarization discriminator eventually eliminates the polarization dispersion. The auxiliary discriminator includes a plate of a uniform thickness inclined at a tilt angle with respect to the reference axis selected so that the transverse deflection difference incurred during the passage through the one polarization discriminator is eliminated in the other polarization discriminator. This facilitates achieving very low polarization dependent loss in the isolator.

8 Claims, 3 Drawing Sheets

OPTICAL ISOLATOR WITH POLARIZATION DISPERSION AND DIFFERENTIAL TRANSVERSE DEFLECTION CORRECTION

BACKGROUND OF THE INVENTION

Cross-reference to Related Application

The present application is a continuation-in-part of commonly-owned U.S. patent application Ser. No. 07/762,665, filed Sep. 19, 1991, now abandoned.

FIELD OF THE INVENTION

The present invention relates to an optical isolator with polarization dispersion correction and transverse deflection equalization and, more particularly, to an optical isolator including a birefringent compensator to perform both the polarization dispersion correction and the transverse deflection equalization.

DESCRIPTION OF THE PRIOR ART

Reflections in optical systems often generate noise and optical feedback which may degrade the performance of various system components particularly semiconductor lasers. Therefore, the ability to optically isolate lasers and other sensitive components from these reflections is critical to the performance of the system. The Faraday effect in magneto-optic material provides a unique non-reciprocal device capable of performing the isolation function. In general, a conventional optical isolator comprises a 45° Faraday rotator encased within a bias magnet and disposed between a pair of polarization discrimination means (e.g., linear polarizers, birefringent plates, or birefringent wedges) oriented at an angle of 45° to each other. Except for being polarized and rotated, signals passing through the isolator in the transmitting, forward direction will be essentially unaffected by the polarization discrimination means and Faraday rotator. However, return reflections or replicas of the original signals will be rotated such that these replicas will be essentially prevented from propagating back into the signal source (e.g. a laser).

To reduce the insertion losses for coupled fibers, an isolator should operate independently of the polarization state of the applied signal. One arrangement for eliminating polarization dependence is discussed in the article "Compact Optical Isolator For Fibers Using Birefringent Wedges" by M. Shirasaki et al., 21 *Applied Optics*, 4296–99 (1982). In particular, Shirasaki et al. utilize a pair of birefringent wedges, at the input and output of the Faraday rotator, to separate an incident beam into orthogonal, linear polarizations which travel independently through the isolator.

Although the Shirasaki et al. arrangement, and other commercially available isolators, may be polarization independent, they may often exhibit polarization dispersion in that the propagation time of the rays through the birefringent material is a function of polarization state (i.e. extraordinary polarization state vs. ordinary polarization state). In particular, the birefringent material will have a different refractive index for each polarization state. As a result, a net dispersion (i.e., propagation delay between polarization states), typically on the order of a few picoseconds, but in some instances less than a picosecond, will exist as the rays emerge from the isolator. For some applications, this dispersion may present a problem. Additionally, the polarization dispersion may result in a change in the polarization state of the input light. In particular, the wavelength dispersion of the propagation delay produces pseudo-depolarization in a non-monochromatic input light ray by transferring each spectral component into a different polarization state. Both of these effects may be harmful to system performance. The cumulative result of using several such devices in a system may also be significant and substantial. Therefore, a need exists in the art for a means for compensating for, or eliminating, the polarization dispersion introduced in conventional optical isolator arrangements.

Another phenomenon encountered in conventional optical isolators of the type here under consideration is a transverse deflection of each of the two polarized signals into which the applied or incoming optical signal is divided by the first polarization discrimination means encountered by the incoming signal as it proceeds into the isolator. Inasmuch as each of the two polarized signals "sees" (that is, is subjected to) a different one of the aforementioned indices of refraction during its passage through the polarization discrimination means associated or concatenated with the Faraday rotator, depending on its polarization state, the extent of such transverse deflection is different for each of the two polarized optical signals so that these polarized signals emerge from the polarization discrimination/rotator unit or the concatenation in mutual parallelism but with a transverse offset from each other. In some applications, the differential between the transverse deflections of the polarized optical signals may create problems. So, for example, it will be appreciated that, when a focusing lens is arranged downstream of the optical isolator proper in order to focus both of the polarized signals into the same single mode optical fiber core, the relative intensities of such polarized signals subsequent to their launch may be different because they are critically dependent on the positions of the polarized signals relative to the optical fiber input aperture.

In view of the foregoing, it will be realized that it would be desirable to design a compensating arrangement of the above type so as not only to compensate for polarization dispersion, but also to eliminate the differential transverse deflection. This is particularly important in achieving extremely small polarization dependence of the insertion loss as is required for concatenated fiber amplifiers as used in long repeatered undersea systems. At present, there are no known arrangements effective for accomplishing both these tasks simultaneously. As a matter of tact, it was believed prior to the present invention that any measures taken to deal with one of these phenomena (i.e. polarization dispersion or transverse deflection) will aggravate the other, and vice versa.

OBJECTS OF THE INVENTION

Accordingly, it is a general object of the present invention to avoid the disadvantages of the prior art.

More particularly, it is all object of the present invention to provide an optical isolator device that does not possess the disadvantages of the heretofore known devices of this type.

Still another object of the present invention is to construct an optical isolator device of the above type so as to achieve simultaneous compensation of both polarization dispersion and transverse deflection occurring subsequent to polarization of the incoming optical signal. It is yet another object of the invention to develop an optical isolator device design, which simultaneously gives extremely low polarization dispersion and extremely low polarization dependent loss.

A concomitant object of the present invention is to provide a device of the above type that is relatively simple in construction, easy to manufacture and assemble, inexpensive, and yet reliable in operation.

SUMMARY OF THE INVENTION

In keeping with these objects and others that will become apparent hereafter, one feature of the present invention resides in a polarization dispersion-compensated and deflection-equalized optical isolator that incorporates optical isolation means including main polarization discrimination means and Faraday rotation means for subjecting light propagating therethrough in and opposite to a forward direction to a nonreciprocal 45° polarization rotation, and auxiliary polarization discrimination means. The Faraday rotation means and the main and auxiliary polarization discrimination means are mounted on a support in such relative positions and orientations that an applied optical signal propagating in an optical input path section along a reference axis initially encounters one of the main and auxiliary polarization discrimination means and is divided thereby into two polarized optical signals with mutually orthogonal polarization states that experience polarization dispersion and transverse deflection as they pass through the one polarization discrimination means. The mounting of these elements is further such that the optical isolation means permits the polarized optical signals to pass therethrough in the forward direction substantially without attenuation while preventing replicas of said polarized optical signals traveling opposite to said forward direction from returning into the input path section. According to the invention, the other polarization discrimination means is arranged to compensate for polarization dispersion by substantially equalizing the lengths of the optical paths traversed by the two polarized optical signals during their passage through the optical isolation means and the auxiliary polarization discrimination means, and extends at such a tilt angle with respect to a plane normal to the reference axis as to bring the polarized optical signals leaving the other polarization discrimination means in said forward direction into substantial coincidence.

The present invention as thus far described is based on a recognition of the fact that, although a transverse offset between the two polarized optical signals may not be unduly acceptable in some instances, the here existence of transverse deflections of the polarized optical signals as such may not be bothersome even if relatively substantial, as for example where they fall within the limits of acceptable design tolerances or leeway, or where they can easily be taken into account when designing or manufacturing the optical isolator device. Indeed, the transverse deflection equalization obtained in accordance with the present invention as a result of the tilting of the auxiliary polarization discrimination means results in a total transverse deflection of each of the polarized optical signals that is substantially the sum total of the transverse deflections that such polarized optical signals would have suffered individually in the absence of the transverse deflection equalization attributable to the tilt. This increase in the total amount of transverse deflection is nevertheless a small price to pay for elimination of the previously-existing difference between the individual transverse deflections.

It should be mentioned at this juncture that when reference is made herein to polarization discrimination, what is meant is that the affected component affects light with different polarizations in a discriminatory manner based on its polarization states. Thus, for example, when the incoming or applied optical signal, in one implementation of the present invention, reaches the main polarization discrimination means that is associated with the Faraday rotation means, such polarization discrimination (e.g., birefringent) means operates as a polarization selecting means in that it splits the incoming optical signal into orthogonal polarization states (i.e., ordinary and extraordinary) while the auxiliary polarization discrimination means performs as a compensating means in that it eliminates the mode dispersion between and simultaneously equalizes the ultimate transverse deflection of the two differently orthogonally polarized optical signals. Of course, when the forward direction in which the incoming optical signal is applied is the opposite one so that the incoming optical signal first encounters the auxiliary discrimination means, then such auxiliary polarization discrimination means constitutes the polarization selecting means and splits the incoming signal into the two polarized signals, and the compensation function is accomplished by the main polarization discrimination means.

In any event, the optical axes of two birefringent members constituting the main polarization discrimination means are oriented such that, in combination with the 45° polarization rotation (nonreciprocal) associated with the Faraday rotation means, the polarization states of a signal propagating in the forward direction retain their identity as they pass through such birefringent members. In particular, the above-described combination results in no net angular deviation of either ray as the ordinary and extraordinary waves exit the output birefringent member of the main polarization discrimination means. This combination provides optical isolation in the reverse direction since the Faraday rotation means causes the two polarization states to switch identities in going through the birefringent members of the main polarization discrimination means. The result is that both rays (i.e. the o-ray and the e-ray) experience angular deviation, and neither polarization state is coupled to the input signal path of the isolator.

In the following, the invention will be discussed primarily in connection with the initially-desired implementation thereof, that is with the main polarization discrimination means preceding the auxiliary polarization means. In this particular implementation, the polarization propagation delay (i.e. dispersion) in the transmission (forward) direction of a first polarization state (e.g. the o-ray) with respect to the second, orthogonal polarization state (e.g. the e-ray) is cancelled in accordance with the teachings of the present invention by inserting a birefringent plate of a predetermined effective thickness L along the signal path, where L is a function of the material used to form the birefringent plate and is chosen to essentially cancel any dispersion in propagation between the e-ray and o-ray. For the special case where the birefringent plate comprises the same material (e.g. rutile) as the polarization selective members or devices, the effective thickness L is essentially equal to the optical path length through the polarization selective birefringent members of the main polarization discrimination means. The birefringent compensating plate of the invention is oriented, for one, to delay the leading ray (e.g. ordinary) with respect to the lagging ray (e.g. extraordinary) such that the total propagation time through the isolator structure, for each polarization state, is essentially equalized.

In accordance with an advantageous aspect of the present invention, the aforementioned orientation of the main and auxiliary polarization discrimination means with respect to one another is such that of the polarized optical signals which passes through the one polarization discrimination means in one of the polarization states passes through the other polarization discrimination means in the other of the polarization states, and vice versa. It is further advantageous when the arrangement is such that the polarized optical signals encounter different indices of refraction during their passage through the main and auxiliary polarization discrimination means in the one and the other polarization state, respectively. Advantageously, the auxiliary polarization discrimination means has a substantially uniform effective thickness throughout, in which case the tilt angle is determined for the effective thickness of the auxiliary polarization discrimination means such that a difference in the amounts of the transverse deflection experienced by the polarized optical signals during their passage through the one polarization discrimination means due to the different indices of refraction encountered therein is substantially eliminated during the passage of the polarized optical signals through the other polarization discrimination means owing to the different indices of refraction encountered therein. It is especially advantageous when the tilt angle has a value substantially corresponding to that obtained from the equation $$\Theta \approx \frac{\Delta y}{L\left(\frac{1}{n_o} - \frac{1}{n_e}\right)}$$

wherein $\Delta y$ is the amount of said transverse deflection occurring in said main polarization discrimination means, $n_o$ and $n_e$ are said indices of refraction effective in said auxiliary polarization discrimination means, and L is said effective thickness of said auxiliary polarization means, and the small angle approximation is used.

For one particular arrangement of the present invention, the auxiliary polarization discrimination means includes a birefringent plate positioned at the output of the isolator. Alternatively, the birefringent plate may be positioned at the isolator input since it does not affect the isolation function of the device. In general, the birefringent plate may be positioned anywhere along the optical signal path as long as the plate is oriented to provide polarization dispersion and transverse deflection equalization correction in accordance with the teachings of the present invention, whether such correction is done after the tact, as in the first disclosed implementation, or in anticipation of phenomena yet to take place, or in some combination of the two.

Another advantage of the present invention is that polarization dispersion may be easily corrected by determining the total optical path length through the birefringent material within a standard isolator and incorporating a birefringent plate of the same material and essentially the same thickness (and proper orientation) within the conventional package. Moreover, the transverse deflection can be easily equalized (albeit not eliminated) by giving the birefringent plate the proper amount of tilt in the correct sense. The addition of the birefringent plate and its tilting do not appreciably alter the performance of the isolator and only slightly increase the overall size of the arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
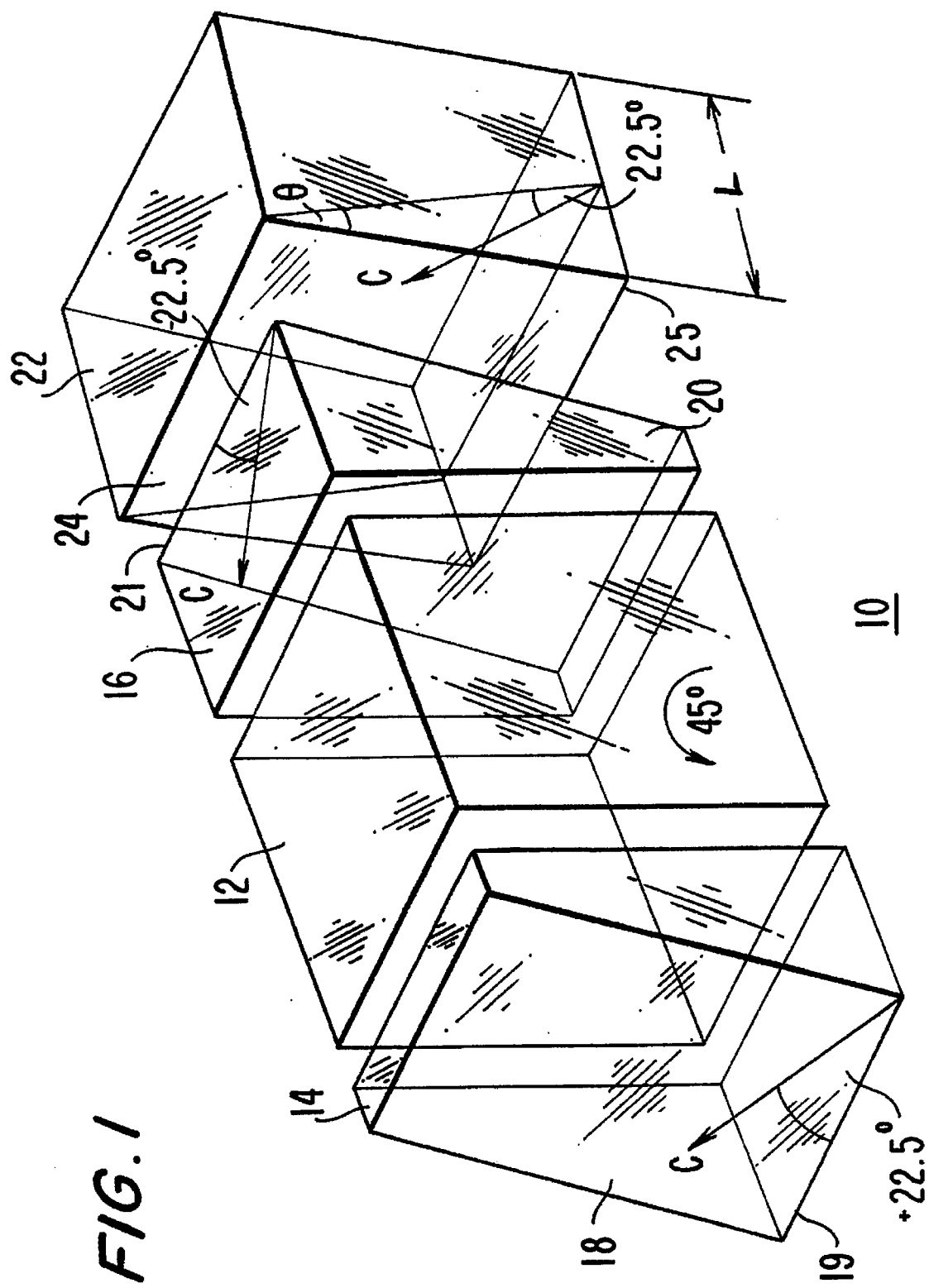
FIG. 1 is a perspective view of an exemplary polarization dispersion compensation and transverse deflection equalization optical isolator assembly formed in accordance with the teachings of the present invention.

FIG. 1 illustrates an exemplary (simplified) optical isolator 10 including polarization dispersion and transverse deflection corrective means in accordance with the teachings of the present invention. It is to be understood that in actual operation, such an isolator 10 requires a permanent magnet and may include lensing elements, as discussed hereinbelow in association with FIG. 3. For the sake of clarity, these components are not shown in FIG. 1 and are not considered as necessary for an understanding of the operation of the isolator in accordance with the teachings of the present invention.

Referring still to FIG. 1, the isolator 10 includes a Faraday rotator 12 (of, for example, YIG crystal, bismuth-substituted YIG, etc.) disposed between a pair of birefringent devices 14, 16. As illustrated, the birefringent devices 14, 16 comprise a pair of birefringent wedges with their optical axes (C-axes) oriented at 45° to one another. In particular, the wedge 14 is illustrated as having its C-axis oriented at an angle of +22.5° with respect to an edge 19 of a beveled surface 18. Similarly, the wedge 16 is illustrated as having its C-axis oriented at an angle of −22.5° with respect to an edge 21 of a beveled surface 20. An advantage of using these particular angles is that it permits identical wedges to be used. Yet, the invention is not restricted to the C-axis orientation. Rather, the C-axis could be aligned with the edge on one wedge and at 45° to the edge on the other wedge. Indeed, this could simplify the design and the fabrication of the tilt compensating element. Any other optical axis orientation is also conceivable and contemplated, so long as the requirement for the two optical axes to be oriented at a 45° angle relative to each other is satisfied. The Faraday rotator 12, as is well known in the art, is designed to provide a nonreciprocal (e.g. counterclockwise) 45° rotation to an optical signal passing therethrough. Thus, as will be discussed in detail below in association with FIG. 3, a transmitted optical signal will pass through the isolator 10 relatively unimpeded, while a reverse (e.g. reflected) optical signal or replica will be prevented by the isolator 10 from re-entering the optical signal input path.

As discussed above, the two polarization states (extraordinary and ordinary) of a transmitted optical signal exhibit different transit times as they propagate through the birefringent wedges 14 and 16. In particular, the refractive index ($n_e$) for an extraordinary (e-) ray within the birefringent material (e.g. titanium dioxide) is slightly greater than the refractive index ($n_o$) for an ordinary (o-) ray traveling through the same material, where the refractive index is defined as the ratio of the signal's velocity in free space with respect to the velocity in the birefringent material. In particular, for $TiO_2$ (rutile) wedges utilized with an input lightwave at $\lambda = 1.5$ μm, $n_e$ is approximately 2.71 and $n_o$ is approximately 2.45. Therefore, as a function of the total optical path length through the wedges 14 and 16, the e-ray emerging from the second birefringent wedge 16 will be delayed relative to the o-ray, where the delay (defined as polarization dispersion) may be on the order of a few picoseconds.

In accordance with the teachings of the present invention, this polarization dispersion is essentially canceled by inserting an additional birefringent device 22 along the optical signal path which functions to adjust the delay between the polarization states such that the e- and- o-rays emerge essentially simultaneously from the isolator 10. Referring to FIG. 1, polarization dispersion correction is accomplished in this particular embodiment of the present invention by including a birefringent plate 22 of an effective thickness or length L along the optical signal path. In particular, the plate 22 is oriented with respect to the birefringent wedge 16 such that the rays entering the plate 22 exchange polarization states. That is, assuming that, as called for above, the incoming signal propagates from left to right as shown in FIG. 1, the plate 22 sees the e-ray exiting the second birefringent wedge 16 as an "o" ray, and the o-ray exiting the wedge 16 as an "e" ray. For the arrangement illustrated in FIG. 1, the plate 22 is shown having its C-axis at an angle of −22.5° with respect to an edge 25 of a front face 24 so as to provide the exchange of polarization state identity. Thus, the C-axis of the plate 22 is rotated a total of 90° so as to be orthogonal to the C-axis of the second wedge 16.

Alternatively, if the plate 22 were inserted in the optical signal path before the first wedge 14, the C-axis of the plate 22 would be oriented at an angle of 90° with respect to the C-axis of the first wedge 14. This, however, is optically equivalent to having the incoming optical signal propagate through the isolator 10 from right to left, provided that this contemplated propagation direction is taken into consideration in orienting and/or operating the Faraday rotator 10, and especially in choosing the polarity of the applied magnetic field.

The aforementioned orthogonal orientation of the optical axis of the plate 22 thus allows, in the first-mentioned case, the original o-ray exiting the second wedge 16 to behave as an e-ray within the plate 22 and to therefore be delayed relative to the original e-ray. As mentioned above, the effective thickness L of plate 22 is chosen so that the delay allows the e- and o-rays to exit the isolator 10 simultaneously. For the case where the same material (e.g. $TiO_2$) is used for both the birefringent wedges 14, 16 and the plate 22, the effective thickness L of the plate 22 is essentially equivalent to the total optical path length through the wedges 14, 16. Otherwise, the plate thickness L is a function of the refractive indices (i.e., $n_e$ and $n_o$) of the chosen material (e.g. calcite) and is calculated to essentially cancel the polarization dispersion.

Figure 2:
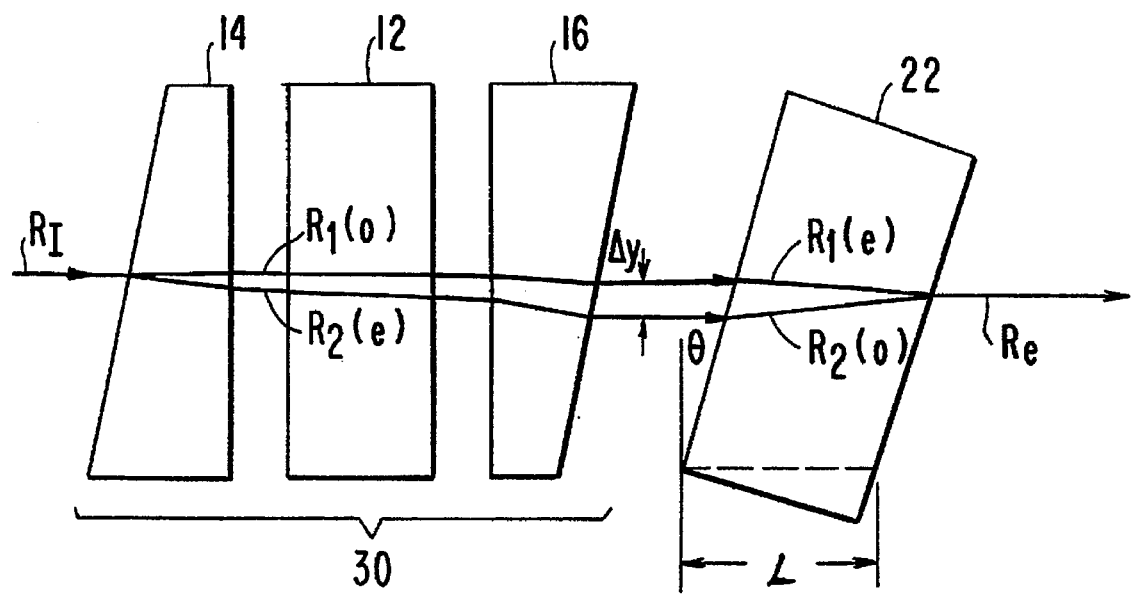
FIG. 2 is a somewhat simplified side elevational view of the assembly of FIG. 1, illustrating in an exaggerated form the behavior of differently polarized rays during their passage therethrough.

As is also ascertainable from FIG. 1 of the drawings, and even more clearly from FIG. 2 to which attention is now directed, the compensating plate 22 extends at an angle θ with respect to a plane normal to a reference axis that forms an extension of an incoming ray $R_1$ (again adhering to the above convention concerning the incoming ray propagation direction). Because of this inclination or tilt, the differently-polarized rays into which the wedge 14 had split the incoming ray $R_1$ and that have passed through an optical isolator unit 30 constituted by a concatenation of the Faraday rotator 12 in a sandwiched relationship with the wedges 14 and 16 as ordinary and extraordinary rays $R_1(o)$ and $R_2(e)$ with attendant different transverse deflections which are indicated by the divergence of the rays $R_1(o)$ and $R_2(e)$, are brought together, or into coincidence, during their passage through the plate 22 as rays $R_1(e)$ and $R_2(o)$. It should be noted that because of the polarization interchange mentioned hereinabove (i.e. the ray $R_1(o)$ becoming $R_1(e)$ and the ray $R_2(e)$ becoming $R_2(o)$), each of such polarized rays encounters a different index of refraction during its passage through the plate 22 than during its passage through the unit 30. This fact is used in accordance with the present invention to achieve the desired restoration of the axial coincidence of such polarized rays on leaving the plate 22 as an output ray $R_o$.

More particularly, and as indicated in FIG. 2, inasmuch as the amounts of the aforementioned transverse deflections of the rays $R_1(o)$ and $R_2(e)$ are different,—by virtue of the different indices of refractions affecting such rays $R_1(o)$ and $R_2(e)$ during their passage from left to right through the wedges 14 and 16,—the rays $R_1(o)$ and $R_2(e)$ emerging from the wedge 16 are parallel to each other and are transversely offset from each other by a distance Δy. It is this difference Δy that must be eliminated to bring the rays $R_1$ and $R_2$ into coincidence during their passage (as rays $R_1(e)$ and $R_2(o)$) through the plate 22. To determine the value of the tilt angle θ needed to eliminate Δy, it should be realized that the tilt angle is that which will result in a transverse offset Δy with the same sense as if the light were traveling from right to left—i.e. in the opposite direction. This value of θ can be easily determined, using the small angle approximation (sin θ=θ), from the well-known equation $$\Delta y = L\Theta \left\{ \frac{1}{n_o} - \frac{1}{n_e} \right\}$$

Of course, the unit 30 does not contain only the wedges 14 and 16; rather, it also includes the Faraday rotator 12 that is typically separated from the wedges 14 and 16 by respective air gaps. The presence of the rotator 12 and/or the air gaps has an influence on the paths of the rays $R_1(o)$ and $R_2(e)$ through the isolator unit 10, but this influence may be readily determined or calculated and taken into consideration when choosing the effective thickness L of the plate 22.

In this context, it should also be mentioned that due to the inclination of the plate 22 by the tilt angle θ with respect to a plane normal to a reference axis coinciding with the axis of the incoming light beam, the effective thickness or length L does not exactly correspond to the thickness of the plate 22; rather, L represents the average length of the optical path of the rays $R_1(e)$ and $R_2(o)$ through the plate 22, corresponding to the actual thickness of the plate 22 divided by cos θ. This difference, while not negligible, merely constitutes one of the factors,—including the influence of the air gap and the rotator—which are to be taken care of when optimizing the design of the optical isolator assembly 10 during its fabrication and/or assembly.

Observation of FIG. 2 will further reveal that the tilt angle θ is such that the absolute value of the deflection for each of the rays $R_1$ and $R_2$ is actually increased as the offset Δy is being eliminated relative to that which would be experienced without the tilt. Nevertheless, all attempts at finding a tilt angle that will bring the rays $R_1$ and $R_2$ into coincidence not only with one another but also with the reference axis, without jeopardizing the polarization dispersion compensation, have been unsuccessful. Indeed, it appears that the polarization dispersion compensation and the reference axis coincidence restoration are inversely related in the sense that steps taken to improve one worsen the other.

The angle θ has been determined for several isolator constructions resembling those currently available but with the compensation plate tilt added. Best results have been obtained with an optical isolator structure in which the wedges 14 and 16 had 3.5° crown angles and the aforementioned air gaps were 0.005" in size. In this situation, the tilt angle θ was found to amount to approximately 12.4°. Of course, this is not the only possible, and perhaps not even the most advantageous, implementation; rather, some additional experimentation may still provide further optimization of the isolator design embodying the present invention.

It will be appreciated from the foregoing description and discussion that the main polarization discrimination means implemented by the birefringent wedges 14 and 16, and the auxiliary polarization means comprised of the plate 22, are functionally interchangeable with one another at least insofar as the transverse deflection of polarized light signals is concerned, so that either one could be arranged at the input end and serve for polarizing and splitting the incoming light, while the other would then serve to bring the transversely deflected polarized light signals together. Thus, the plate 22 may be considered to be a transverse offset compensating element that performs actual compensation for the transverse offset Δy when the incoming light travels from left to right, and anticipatory compensation for conditions to be encountered by incoming light propagating from right to left during its passage through the unit 30.

Figure 3:
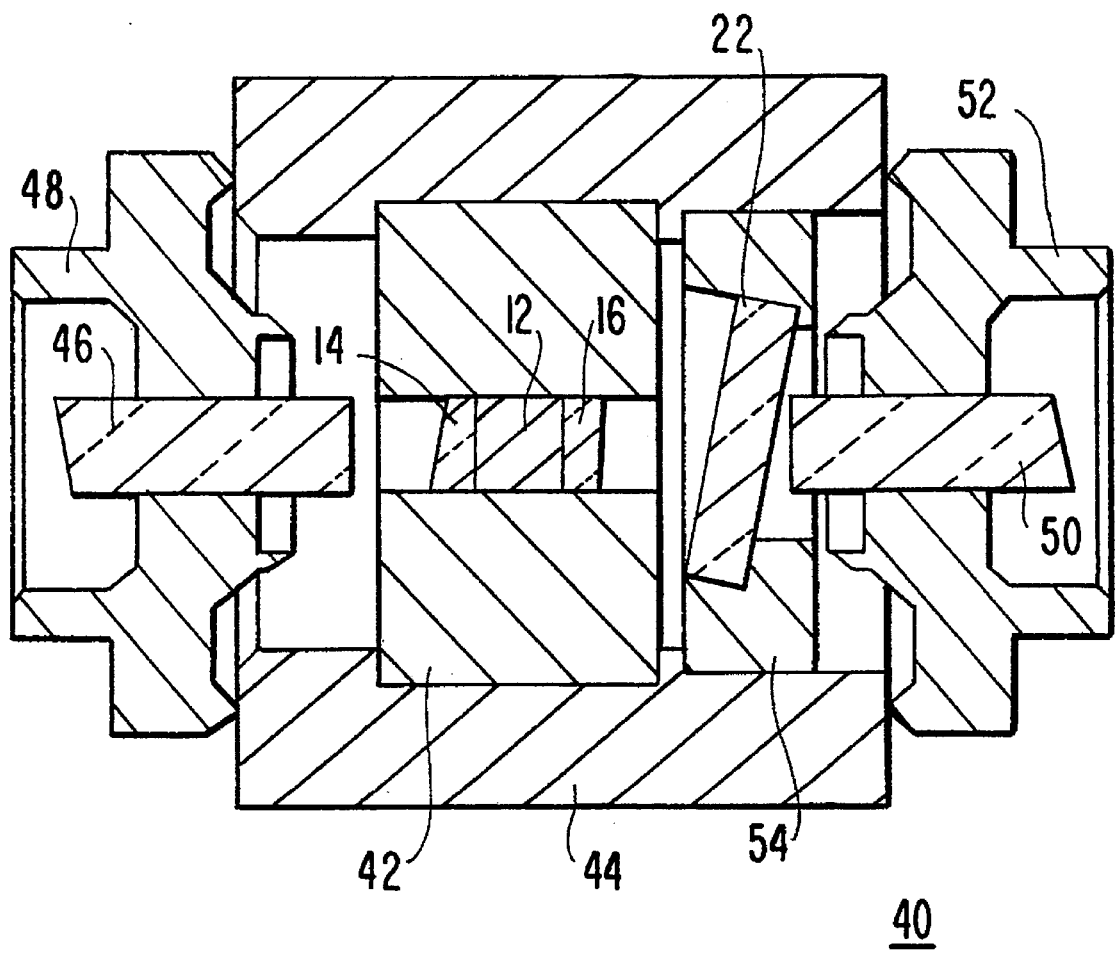
FIG. 3 is an axial sectional view of an exemplary packaged optical isolator including the assembly of FIG. 1.

FIG. 3 illustrates an exemplary packaged isolator 40 including a birefringent compensating plate of the present invention. Referring to FIG. 3, the Faraday rotator 12, the first wedge 14 and the second wedge 16 are joined (using all optically transparent and anti-reflective material) and disposed within a permanent magnet 42, the magnet 42 being utilized to provide the requisite 45° rotation of polarized light during its passage through the magneto-optic material of the Faraday rotator 12. This assembly is then fixed within an outer package 44. An input lensing arrangement 46 (again as considered tier the left-to-right incoming light beam propagation direction), used to form a collimated beam, is held within a fixture 48, with the fixture 48 being attached to the outer package 44. Similarly, an output lensing arrangement 50, used to form a focused beam, is held within a fixture 52 which is also attached to the outer package 44. The polarization dispersion compensation birefringent plate 22 of the present invention is disposed between the second wedge 16 and the output lensing arrangement 50, extending at an angle θ as shown in FIG. 2. In particular, the plate 22 is held within a fixture 54 that is attached to the outer package 44.

It is to be noted that the plate 22 may be inserted in the optical signal path between the input lensing arrangement 46 and first birefringent wedge 14, and these perform the same polarization dispersion compensation function as well as the anticipatory transverse offset compensation or equalization function. As previously mentioned, however, this would be tantamount to having the incoming light propagate through the assembly or package 40 in the right-to left direction. Further, although the above-described arrangement utilizes birefringent wedges as the polarization selective components, it will be understood that other suitable combinations of polarization selective devices, well known in the design of optical isolators (as for example a combination of three birefringent plates of appropriate thicknesses) may be used and the polarization dispersion compensating plate of the present invention accordingly sized and oriented to form relatively equal optical path lengths for both the extraordinary and ordinary rays traveling therethrough. It will also be understood that similar results can be obtained utilizing a birefringent plate of a material other than that used to form the above-described polarization selective birefringent devices, where the length of the birefringent compensating plate is selected on the basis of the refractive index difference for the two rays of the chosen material.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is, therefore, the intention to be limited only as indicated by the scope of the claims appended hereto.

What is claimed is:

1. An optical isolator for isolating an optical signal source from reflected signals, comprising:

main polarization discrimination means for receiving and polarizing an optical signal from the optical signal source such that the optical signal upon entering said main polarization discrimination means is polarized and dispersed into ordinary and extraordinary rays that exhibit differential transverse deflection and differential propagation delay relative to one another while propagating through said main polarization discrimination means; and auxiliary polarization discrimination means disposed proximate said main polarization discrimination means and through which said ordinary and extraordinary rays from said main polarization discrimination means propagate for refractively adjusting the differential transverse deflection and differential propagation delay of the ordinary and extraordinary rays as said rays propagate through said auxiliary polarization discrimination means so as to minimize the differential transverse deflection and differential propagation delay of the ordinary and extraordinary rays as said rays propagate through said optical isolator, said auxiliary polarization discrimination means being selectively dimensioned so as to predeterminedly adjust the differential propagation delay of said rays as the rays propagate through the auxiliary polarization discrimination means, and said auxiliary polarization discrimination means having surfaces through which said rays propagate and selectively inclined at a selected tilt angle θ relative to a path of propagation of said rays to predeterminedly adjust the differential transverse deflection of said rays as the rays propagate through said auxiliary polarization discrimination means:

wherein said tilt angle θ is defined by $$\Theta = \frac{\Delta Y}{L\left(\frac{1}{\eta_o} - \frac{1}{\eta_e}\right)}$$

wherein Δy is the differential transverse deflection occurring in said main polarization discrimination means, $n_o$ and $n_e$ are indices of refraction effective in said auxiliary polarization discrimination means for said ordinary and extraordinary rays respectively, and L is an effective thickness of said auxiliary polarization discrimination means.

2. The optical isolator as defined in claim 1, wherein said main polarization discrimination means comprises:

first and second polarization discrimination means for polarizing an optical signal; and Faraday rotation means for rotating said rays and interposed between said first and second polarization discrimination means.

3. The optical isolator as defined in claim 2, wherein said first and second polarization discrimination means comprise first and second birefringent members.

4. The optical isolator as defined in claim 3, wherein each of said first and second birefringent members is shaped as a wedge.

5. The optical isolator as defined in claim 3, wherein said auxiliary polarization discrimination means comprises a third birefringent member.

6. The optical isolator as defined in claim 5, wherein said third birefringent member comprises a plate and said auxiliary polarization discrimination means surfaces comprise first and second substantially parallel surfaces of said plate and through which the ordinary and extraordinary rays respectively enter and exit from said plate as said rays propagate through said plate, said first surface being selectively inclined at said tilt angle $\theta$ and said tilt angle $\theta$ being substantially equal to sine $\theta$.

7. The optical isolator as defined in claim 1, wherein said main and auxiliary polarization discrimination means are formed of the same material.

8. The optical isolator as defined in claim 7, wherein said main and auxiliary polarization discrimination means comprise $TiO_2$.

* * * * *